United States Patent
Conradt

(10) Patent No.: US 11,584,598 B2
(45) Date of Patent: Feb. 21, 2023

(54) VACUUM CONVEYOR FOR CONVEYING GRANULATE AND/OR POWDERY MATERIAL

(71) Applicant: FMK Innovation A/S, Humlebæk (DK)

(72) Inventor: Daniel Niklas Conradt, Humlebæk (DK)

(73) Assignee: FMK INNOVATION A/S, Humlebæk (DK)

( * ) Notice: Subject to any disclaimer, the term of this patent is extended or adjusted under 35 U.S.C. 154(b) by 0 days.

(21) Appl. No.: 17/053,319

(22) PCT Filed: May 14, 2019

(86) PCT No.: PCT/DK2019/050151
§ 371 (c)(1),
(2) Date: Nov. 5, 2020

(87) PCT Pub. No.: WO2019/219141
PCT Pub. Date: Nov. 21, 2019

(65) Prior Publication Data
US 2021/0070558 A1   Mar. 11, 2021

(30) Foreign Application Priority Data
May 14, 2018   (DK) .......................... PA 2018 70291

(51) Int. Cl.
*B65G 53/64*   (2006.01)
*B33Y 80/00*   (2015.01)
(Continued)

(52) U.S. Cl.
CPC .............. *B65G 53/64* (2013.01); *B33Y 80/00* (2014.12); *B65G 43/00* (2013.01); *B65G 53/24* (2013.01);
(Continued)

(58) Field of Classification Search
CPC ........ B65G 53/64; B65G 53/24; B65G 53/46; B65G 53/60; B65G 43/00; B33Y 80/00
See application file for complete search history.

(56) References Cited

U.S. PATENT DOCUMENTS 168,029 A    9/1875  Körting
1,280,780 A * 10/1918 Lob ........................ B65G 53/30
                                                    406/197
(Continued)

FOREIGN PATENT DOCUMENTS

CN     203372827 U    1/2014
DK         104340 C    5/1966
(Continued)

OTHER PUBLICATIONS

International Search Report for PCT/DK2019/050151 dated Aug. 30, 2019.
(Continued)

*Primary Examiner* — William R Harp
(74) *Attorney, Agent, or Firm* — Knobbe, Martens, Olson & Bear, LLP

(57) ABSTRACT

The present invention relates to a vacuum conveyor for conveying granulate and/or powdery material, the conveyor comprising: a main body having an upper end and a lower end; a cavity inside the main body, said cavity comprising an opening arranged at the lower end of the main body; a valve arranged at the opening position between an open position allowing a flow of granulate and/or powdery material out from the cavity through said opening and a sealing position sealing said opening; an inlet arranged at the upper end of the main body forming an inlet passage into the cavity; a venturi inside the main body at a position being distinct from the cavity, said venturi comprising an inlet and an outlet; and a suction channel fluidly connecting the throat of the venturi
(Continued)

Section A-A with the interior of the cavity at a position at or above the inlet.

25 Claims, 9 Drawing Sheets

(51) Int. Cl.
   *B65G 43/00* (2006.01)
   *B65G 53/24* (2006.01)
   *B65G 53/46* (2006.01)
   *B65G 53/60* (2006.01)

(52) U.S. Cl.
   CPC ............. *B65G 53/46* (2013.01); *B65G 53/60* (2013.01); *B65G 2201/042* (2013.01); *B65G 2203/0258* (2013.01); *B65G 2203/0283* (2013.01); *B65G 2207/32* (2013.01)

(56) References Cited

U.S. PATENT DOCUMENTS

| | | | | |
|---|---|---|---|---|
| 3,018,135 A | * | 1/1962 | Reib | ........................ B65G 53/24 406/116 |
| 3,423,130 A | * | 1/1969 | Milner | ............... B65G 49/0495 406/23 |
| 3,561,824 A | * | 2/1971 | Homan | ................. B04C 5/12 406/173 |
| 4,545,410 A | | 10/1985 | Paul et al. | |
| 4,697,962 A | * | 10/1987 | Dunbar | ................... B65G 53/12 406/15 |
| 5,033,914 A | * | 7/1991 | Wuertele | ................ B65G 53/28 406/109 |
| 5,142,732 A | | 9/1992 | Davis | |
| 5,791,830 A | | 8/1998 | Fort et al. | |
| 8,215,877 B2 | * | 7/2012 | Rieger | ................... B05B 7/1459 406/96 |
| 8,672,116 B2 | * | 3/2014 | Calloway | ............... B65G 39/09 193/37 |
| 8,753,432 B2 | * | 6/2014 | Maguire | ............... B65G 53/40 95/280 |
| 9,758,319 B2 | * | 9/2017 | Celella | .................. B65G 53/36 |
| 9,854,729 B2 | * | 1/2018 | Hyman | .................. A01C 7/084 |

FOREIGN PATENT DOCUMENTS

| | | |
|---|---|---|
| ES | 2112678 A1 | 4/1998 |
| FR | 2011532 A1 | 3/1970 |
| GB | 1094112 A | 12/1967 |
| WO | WO 2016/130874 A1 | 8/2016 |

OTHER PUBLICATIONS

Jishu, Yeya Qidong "Hydropneumatic Technology" The Open Universiy of China, China Central Radio and Television University Press—Beijing, Aug. 2013, Chapter 11, Pneumatic Components 315.
Office Action for CN 201980039916.9 dated Nov. 3, 2021.

* cited by examiner

VACUUM CONVEYOR FOR CONVEYING GRANULATE AND/OR POWDERY MATERIAL

CROSS REFERENCE TO RELATED APPLICATIONS

This application is a U.S. National Phase Application of PCT International Application Number PCT/DK2019/050151, filed on May 14, 2019, designating the United States of America and published in the English language, which is an International Application of and claims the benefit of priority to Danish Patent Application No. PA 2018 70291, filed on May 14, 2018. The disclosures of the above-referenced applications are hereby expressly incorporated by reference in their entireties.

FIELD OF THE INVENTION

The present invention relates to a vacuum conveyor for conveying granulate and/or powdery material, the conveyor comprising: a main body having an upper end and a lower end; a cavity inside the main body, said cavity comprising an opening arranged at the lower end of the main body; a valve arranged at the opening positionable between an open position allowing a flow of granulate and/or powdery material out from the cavity through said opening and a sealing position sealing said opening; an inlet arranged at the upper end of the main body forming an inlet passage into the cavity; a venturi inside the main body at a position being distinct from the cavity, said venturi comprising an inlet and an outlet; and a suction channel fluidly connecting the throat of the venturi with the interior of the cavity at a position at or above the inlet.

BACKGROUND OF THE INVENTION

Conveying of granulate and/or powdery material in a production facility such as an injection moulding process with plastic materials, often makes use of conveyors conveying the material from containers to the site of use. Such conveyors are powered by electricity and often needs a vacuum system which has been found to be labour and money intensive during installation and requires attention to avoid hazardous situations during such conveyors lifetime. This is found to be disadvantageous and hence, an improved conveyor would be advantageous, and in particular a more efficient and/or reliable conveyor would be advantageous.

OBJECT OF THE INVENTION

It is an object of the present invention to provide an alternative to the prior art. In particular, it may be seen as an object of the present invention to provide a conveyor that solves the above mentioned problems of the prior art.

SUMMARY OF THE INVENTION

Thus, the above described object and several other objects are intended to be obtained in a first aspect of the invention by providing a vacuum conveyor for conveying granulate and/or powdery material, the conveyor preferably comprising:
a main body having an upper end and a lower end;
a cavity inside the main body, said cavity comprising an opening arranged at the lower end of the main body;
a valve arranged at the opening positionable between an open position allowing a flow of granulate and/or powdery material out from the cavity through said opening and a sealing position sealing said opening;
an inlet arranged at the upper end of the main body forming an inlet passage into the cavity;
a venturi inside the main body at a position being distinct from the cavity, said venturi comprising an inlet and an outlet;
a suction channel fluidly connecting the throat of the venturi with the interior of the cavity at a position at or above the inlet.

In some embodiments, the valve is biased towards the sealing position by a counter balancing weight arranged so that gravity maintains it in its sealing position until the weight of the granulate and/or powdery material in the cavity exceed the counter balancing weight, thereby opening the valve.

In some embodiments, the valve comprise a valve plate having a valve seat of a dimension being sufficient to cover the opening, said valve plate being rotatably hinged by a hinge to said main body, so that the valve plate (9) rotatably can be moved between the sealing position and the open position.

In some embodiments, the conveyor is provided with a sensor for sensing whether the valve is in the open or sealing position, said sensor preferably comprising a magnetic sensor, such as a hall sensor, wherein said sensor is preferably arranged to sense the position of the valve through a wall of the main body.

In some embodiments, the conveyer further comprising a weight sensor for sensing the amount of granulate material in the cavity, said sensor preferably comprising a weighing cell measuring the weight of granulate inside the cavity by sensing the force acting on the body.

In some embodiments, the conveyor further comprise a funnel shaped restrictor arranged inside said cavity and narrowing down in the direction towards the lower end with its smallest cross section below or at a lowest position of the inlet.

In some embodiments, the conveyor further comprising an air filter arranged to filter out particulates before air is sucked into the suction channel.

In some embodiments, the upper end of the main body is formed by a detachable lid, said lid and main body comprising a bayonet joint, and at least a part of the suction channel is provided in said lid.

In some embodiments, said lid secures the air filter in a fixed position.

In some embodiments, the main body is formed as an integral element with the venturi including the inlet and outlet, the inlet and the suction channel formed by shaping the main body.

In some embodiments, the inlet of the venturi is provided with a snap-coupling, for connecting a hose feeding pressurized air into the venturi.

In some embodiments, the venturi has no moving parts.

In some embodiments, the conveyer further comprise a silencer arranged at the outlet of the venturi and configured to dampen noise generated by air flowing through the venturi.

In some embodiments, the silencer is releasable arranged at the outlet through a bayonet joint.

In some embodiments, the conveyer further comprising an external cavity configured for or containing a control unit.

In some embodiments, the control unit is configured for controlling said electro-mechanically valve and said control unit being configured for exchanging control signal(s) and/or data through a connector, preferably being an RJ45 connector, which connector also applies power to the control unit. In other embodiments, the power may be applied through a separate connector.

In some embodiments, the main body is provided with a snap-coupling, or a coupling as such, such as a part of a bayonet joint, for connecting the main body with a flange.

In some embodiments, the main body and a flange can be fixated in a connected arrangement by a locking mechanism.

In some embodiments, the main body and/or the inlet and/or the venturi and/or the external cavity and/or the suction channel and/or silencer and/or restrictor and/or valve and/or the lid essentially consist of a plastic material, such as PLA or PA.

In some embodiments, the weight of the conveyer is less than 5 kg, such as less than 3 kg, such as less than 2 kg, such as less than 1.5 kg.

In some embodiments, the capacity of the conveyer is at least 3 kg/hours, such as at least 4 kg/hour, such as at least 5 kg/hour, preferably at least 10 kg/hour, such as at least 15 kg/hour, preferably at least 20 kg/hour, such as at least 25 kg/hour. Practical experiments with the conveyer suggest that an upper limit for the capacity could be as high as 100 kg/hour, although and upper practical limit of 25 kg/hour appears feasible. The term "capacity" is typically used to mean the amount of granulate and/or powdery material conveyed through the conveyor per hour. The capacity may depend on the lift of conveyer, that is typically the height the granulate and/or powdery material is lifted from a reservoir to the cavity inside the main body of the conveyor. Often, the capacity may be a standardized capacity corresponding to a lift of 3.0 meters.

In some embodiments, the lift of the conveyer is at least two meters, such as at least 2.5 meters, such as at least 3 meters.

The venturi is herein preferably disclosed as forming an integral part of the main body (e.g. by being 3D printed together with other features of the conveyor). Although it is preferred that the venturi is made integral with main body as disclosed in the appendix figures, the venturi may be made as a separate and detachable element, so that the main body may be formed by attaching the venturi. Similarly. Other elements of the main body, e.g. an element forming the suction channel may be made as separate and detachable elements.

In some embodiments, the conveyor may further comprise a display configured to display different operation modes of the conveyor.

In a second aspect, the present invention relates to a method for conveying a material from one point to another using a conveyer according to the present invention, comprising the steps of:
  providing a flow of compressed air through the venturi to provide a suction at the inlet, wherein granulate and/or powdery material can be conveyed through the inlet into the cavity, when the control unit receives a signal from said hall sensor indicating that the valve is in the sealed position
  shutting of the flow of compressed air through the venturi when the control unit receives a signal from said weight sensor or a timer exceeds a predefined time period, the timer may be an internal timer of the conveyor, indicating that the amount of granulate and/or powdery material within the cavity is above a certain threshold,
  opening of the valve as a result of gravity, wherein granulate and/or powdery material flow out of the opening;
  closing of the valve as a result of gravity when the cavity is emptied, due to the counter balancing weight arranged so that gravity bias the valve towards its sealed position.

Accordingly, in some embodiments, the timer may control the time during which the compressed air is supplied; and the time period may be determined based on experiments.

In some embodiments, the method of the present invention comprise 3D printing the main body and/or the inlet and/or the venturi and/or the suction channel and/or the external cavity and/or silencer and/or restrictor and/or valve and/or the lid.

In some embodiments, the main body is 3D printed, with the venturi, including the inlet and outlet, the inlet and the suction channel formed by shaping the interior of the main body to provide the contours thereof. The 3D printer may be a hobby desktop 3D printer.

In the present context terms are used in manner being ordinary to a skilled person. Some of these terms are elucidated below.

"Sealing" e.g. as used in "sealing said opening" is in some preferred embodiment preferably used to mean a sealing to obtain and maintain vacuum of sufficient magnitude to sucking into the cavity granulate and/or powdery material.

"Granulate and/or powdery material" is typically used to mean elements of material having a size allowing it to enter into the cavity. Granulate and/or powdery material may be made of plastic but may also be made of other materials as well.

"Vacuum" in "vacuum conveyor" refers to the suction provided by the venturi sucking into the cavity granulate and/or powdery material. Vacuum should not be interpreted as 0 bar, since vacuum is used to refer to a pressure difference providing suction.

In another aspect, the invention relates to a method of controlling a conveyor, such as a conveyor according to the present invention.

The first, and second aspect, as well as the different embodiments of the present invention may each be combined with any of the other aspects or embodiments of the invention. These and other aspects of the invention will be apparent from and elucidated with reference to the embodiments described hereinafter.

BRIEF DESCRIPTION OF THE FIGURES

The present invention and in particular preferred embodiments thereof will now be described in more details with regard to the accompanying figures. The figures show ways of implementing the present invention and are not to be construed as being limiting to other possible embodiments falling within the scope of the attached claim set.

DETAILED DESCRIPTION OF AN EMBODIMENT

Figure 1:
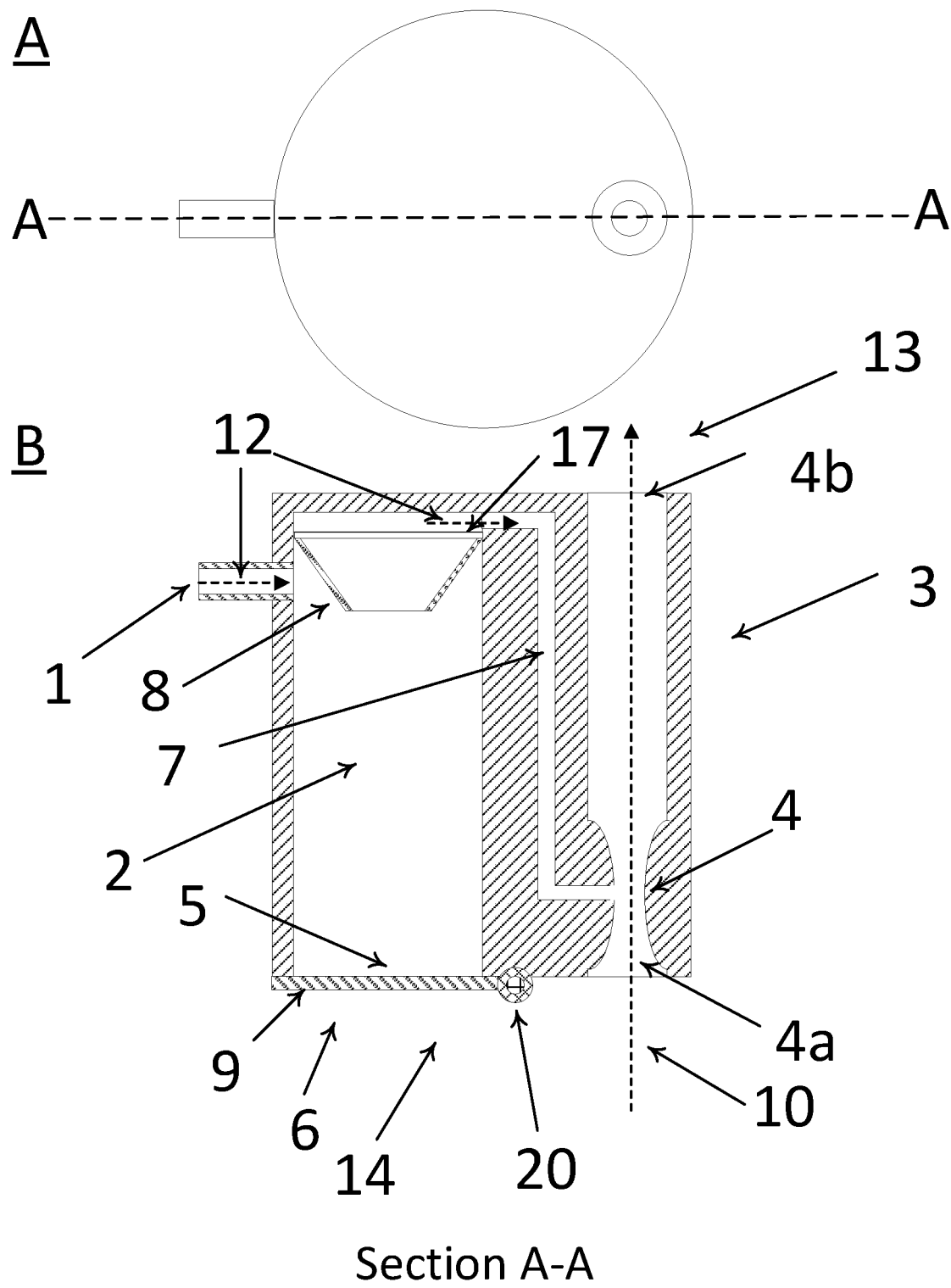
FIG. 1 is a schematic illustration of an embodiment of the present invention, wherein the illustration shows the invention from above (A) and in cross sectional view (B)

Reference is made to FIG. 1 schematically illustrating an embodiment of a vacuum conveyor according to the present invention, for conveying granulate and/or powdery material. As illustrated, a conveyor of the present invention comprises a main body 3 having an upper end 13 and a lower end 14, where upper and lower refers to an orientation with gravity acting downward. This is the typical orientation of the conveyer, since the granulate and/or powdery material typically flow out from the conveyor by gravitational forces.

The conveyor comprises a cavity 2 inside the main body 3, and said cavity is configured in shape and size to contain a certain amount of granulate and/or powdery material which is—as will be disclosed below—sucked into the cavity 2.

The cavity 2 comprise an opening 5 arranged at the lower end of the main body 3. Discharge of material contained in the cavity 2 is controlled by a valve 6 arranged at the opening 5 positionable between an open position allowing a flow of granulate and/or powdery material out from the cavity 2 through said opening 5 and a sealing position sealing said opening 5. The sealing of the opening 5 may in some embodiments be improved by arranged a sealing ring (not shown) encircling the opening 5 and sandwiched between the opening 5 and the valve 6, when the valve 6 is in its sealing position. The sealing ring may be may be made from rubber, such as nitrile rubber, e.g. NBR and may in the form of a V-ring.

The valve 6 may comprise a valve plate 9 having a valve seat of a dimension being sufficient to cover the opening 5, said valve plate being rotatably hinged by a hinge to said main body, so that the valve plate (9) rotatably can be moved between the sealing position and the open position.

In the embodiment shown in FIG. 1, the valve comprise a valve plate 9 rotatable arranged by a hinge 20, so that the valve 6 may be altered between its opening and sealing position (in FIG. 1 the valve is in its sealing position) by rotating the valve plate 9 around its fulcrum point provided by the hinge 20.

The valve plate 9 is a particular preferred embodiment of the invention, but other embodiments of the valve 6 are considered to be within the reach of the present invention.

In some embodiments, the valve is biased towards the sealing position by a counter balancing weight arranged so that gravity maintains it in its sealing position until the weight of the granulate and/or powdery material in the cavity exceed the counter balancing weight, thereby opening the valve. Closing of the valve 6 may be accomplished by gravity combined with no or little weight on the valve plate 9 to pull the valve plate 9 into its open position. By little weight is meant less weight than the weight of the counter balancing weight.

In some embodiments, the valve plate 9 is made from a non-magnetic material and a magnetic material, such as iron, is arranged on/in the plate 9.

The conveyor also comprises an inlet 1 arranged at the upper end 13 of the main body 3 forming an inlet passage into the cavity 2. Granulate and/or powdery material enters into the cavity 2 through this inlet 1.

The inlet may be fluidly connected to a flexible tube or pipe, so granulate and/or powdery material can be conveyed through the flexible tube or pipe and then through the inlet 1.

The suction of granulate and/or powdery material is provided by a venturi 4 provided inside the main body 3 at a position being distinct from the cavity 2. By distinct from the cavity 2 is meant that the throat of the venturi 4 is fluidly connected, through a suction channel 7, with the interior of the cavity 2, at position at or above the inlet 1. Further, the venturi has an inlet 4a and an outlet 4b both of which is arranged outside the cavity 2. Thus, by providing a flow of e.g. compressed air through the venturi 4 in a direction from the inlet 4a to the outlet 4b, a suction is provided which is communicated to the inlet 1 whereby a suction is provided at the inlet 1. When the inlet 1 is connected to a source of granulate and/or powdery material, this material can be sucked into the cavity 2.

It is noted, that although the venturi disclosed in the embodiments herein is disclosed as being orientated with a flow of air from the lower 14 end to the upper end 13, the invention is not limited to such orientation, since the venturi may be orientated at any desired angles relatively to upper and lower end, although this would require a redesign of the course of the suction channel.

Since granulate and/or powdery material is sucked into the cavity 2 by the venturi 4, there is a risk that the material is sucked into the venturi 4. To minimize or even prevent such a flow, the conveyor may comprise a funnel shaped restrictor 8 arranged inside said cavity 2 and narrowing down in the direction towards the lower end 14 with its smallest cross section below or at a lowest portion of the inlet 1. This is illustrated in FIG. 1 where the restrictor 8 is arranged so that granulate and/or powdery material is directed downwardly by the side of the restrictor 8 when entering into the cavity 2. Air is sucked through the lower opening of the restrictor 8, upwardly and into the suction channel 7.

Even though the restrictor may at least potentially prevent granulate and/or powdery material to flow into the suction channel, some material may escape the restrictor 8 and flow upwardly towards the suction channel 7. To prevent flow of such material into the suction channel 7, the conveyor may be equipped with an air filter 17 arranged to filter out particulates before air is sucked into the suction channel 7. Such an air filter 17 may be arranged on top of the restrictor 8.

A conveyor according to the present invention may advantageously be provided with a sensor for sensing whether the valve 6 is in the open or sealing position. This can be used in order to provide input to controller, such that once a suction is provided by the venturi, the valve 6 is closed whereby granulate and/or powdery material can be sucked into the cavity 2. Typically, such a sensor may comprise a magnetic sensor, such as a hall sensor 22 and the sensor is preferably arranged to sense the position of the valve 6 through a wall of the main body 3. This may be embodied by the e.g. the valve plate 9 comprising a material, such as iron, which can be sensed by the sensor arranged externally to the cavity 2 and preferably outside the main body 3.

A conveyor according to preferred embodiments of the invention may also comprise a sensor for sensing amounts of granulate material in the cavity 2. This may be embodied as the sensor being a weighing cell measuring the weight of granulate inside the cavity, e.g. by sensing the force acting on the valve 6 or the valve plate 9.

Figure 2:
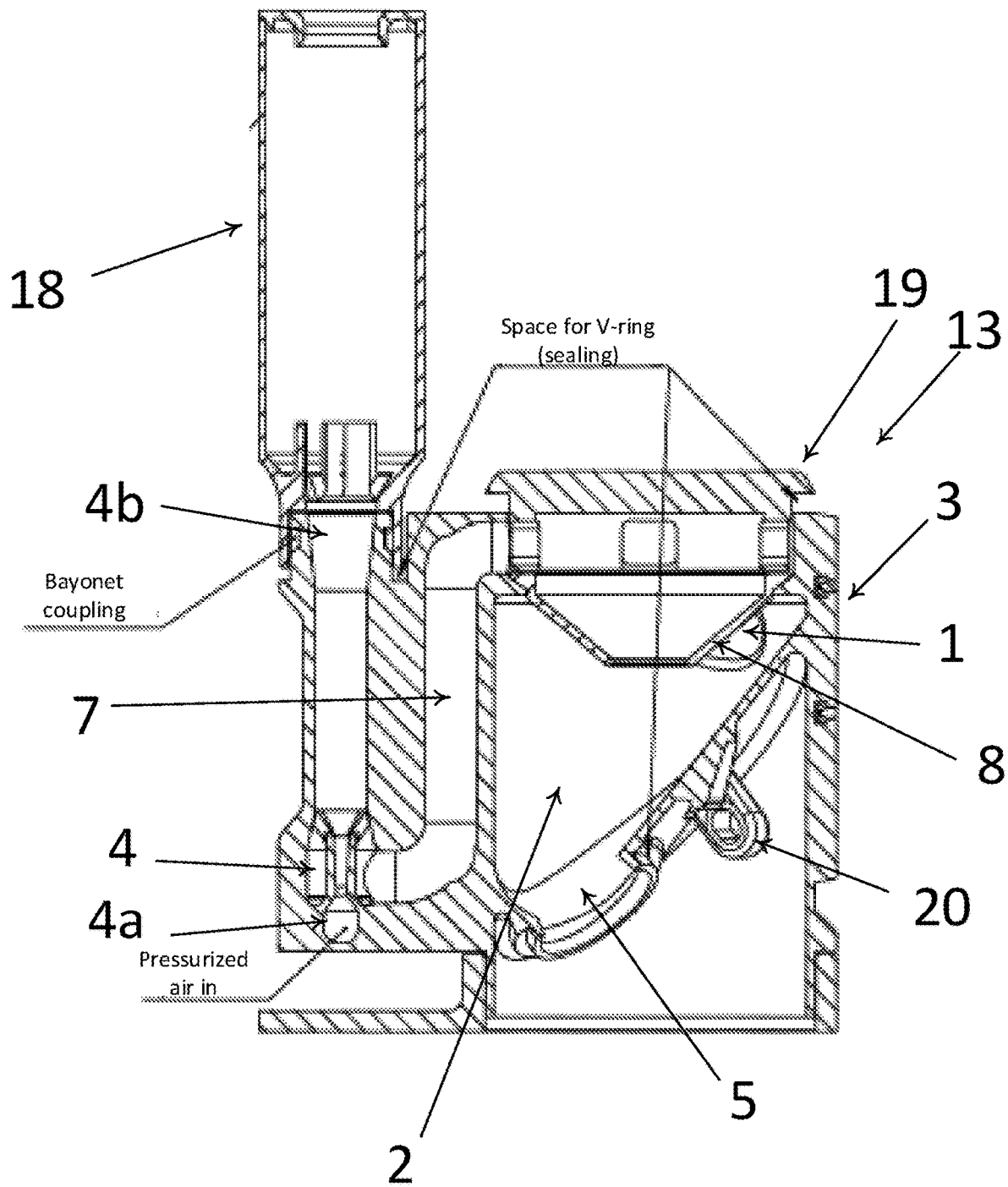
FIG. 2 is a schematic illustration of an embodiment of the present invention, wherein the illustration shows the invention in cross sectional view.

Reference is made to FIG. 2 depicting a side-view of another embodiment of a conveyor according to the present invention. The features of the embodiment described in FIG. 1 may also be present in the embodiment described in FIG. 2. However, in FIG. 2 is illustrated a conveyor where the main body 3 is formed as an integral element with the venturi 4, including the inlet and outlet 4a, 4b, the inlet 1 and the suction channel 7 formed by shaping the main body 3. Furthermore, the upper end 13 of the main body 3 is formed by a detachable lid 19 and a restrictor 8 formed integral with the lid 19. This may inter alia provide access to the interior of the conveyor and to the cavity 2. The lid 19 and main body 3 may comprise a bayonet joint so that the lid can be secured to the conveyor by the bayonet joint. Please observe, that in FIG. 2 the valve plate 9 which sits in the hinge part 20 is not shown.

Preferably, at least a part of the suction channel 7 is provided in said lid 19. The lid 19 when arranged on the conveyor may also be used to secure the restrictor 8 in a fixed position, if the restrictor 8 is not formed integral with the main body 3. In addition, said lid 19 may also secure the air filter 17 in a fixed position.

In preferred embodiments, the venturi has no moving parts.

Since air flowing through a venturi 4 has a tendency to generate noise, often loud noise, which in general may be considered undesired, preferred embodiments of a conveyor may further comprise a silencer 18 arranged at the outlet 4b of the venturi 4, as illustrated in FIG. 2. The silencer 18 is configured to dampen noise generated by air flowing through the venturi 4. The silencer 18 shown in FIG. 2 is a tubular element arranged at the outlet 4b. Inside the tubular element, noise absorbing material(s) and/or other elements, e.g. perforated tubes may be arranged. The silencer 18 may be releasable arranged at the outlet through a bayonet joint. In this way, the silencer may easily be arranged on the venturi 4.

Figure 3:
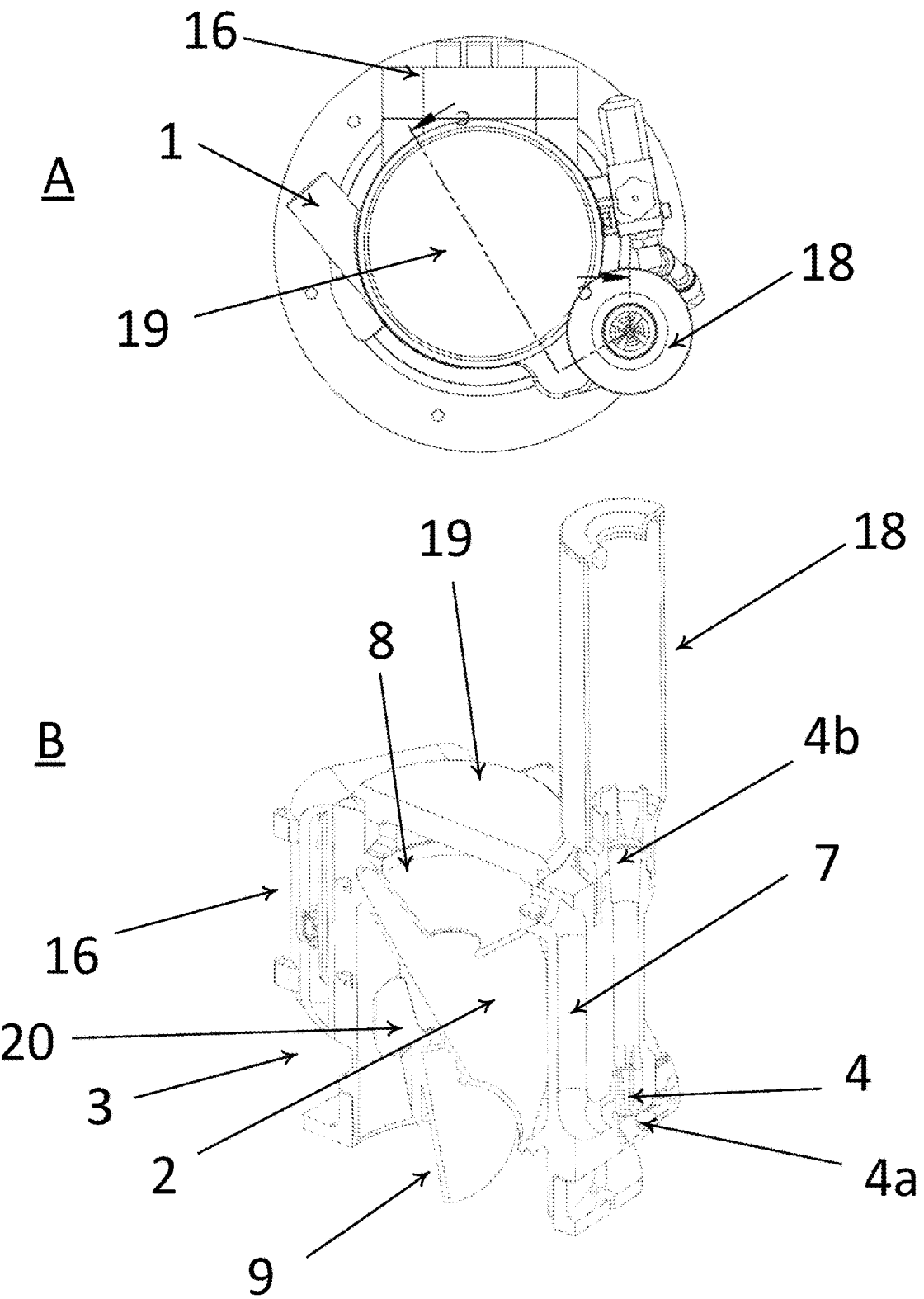
FIG. 3 is an illustration of an embodiment of the present invention, wherein the illustration shows the invention from above (A) and in three-dimensional cross sectional view (B)
Figure 5:
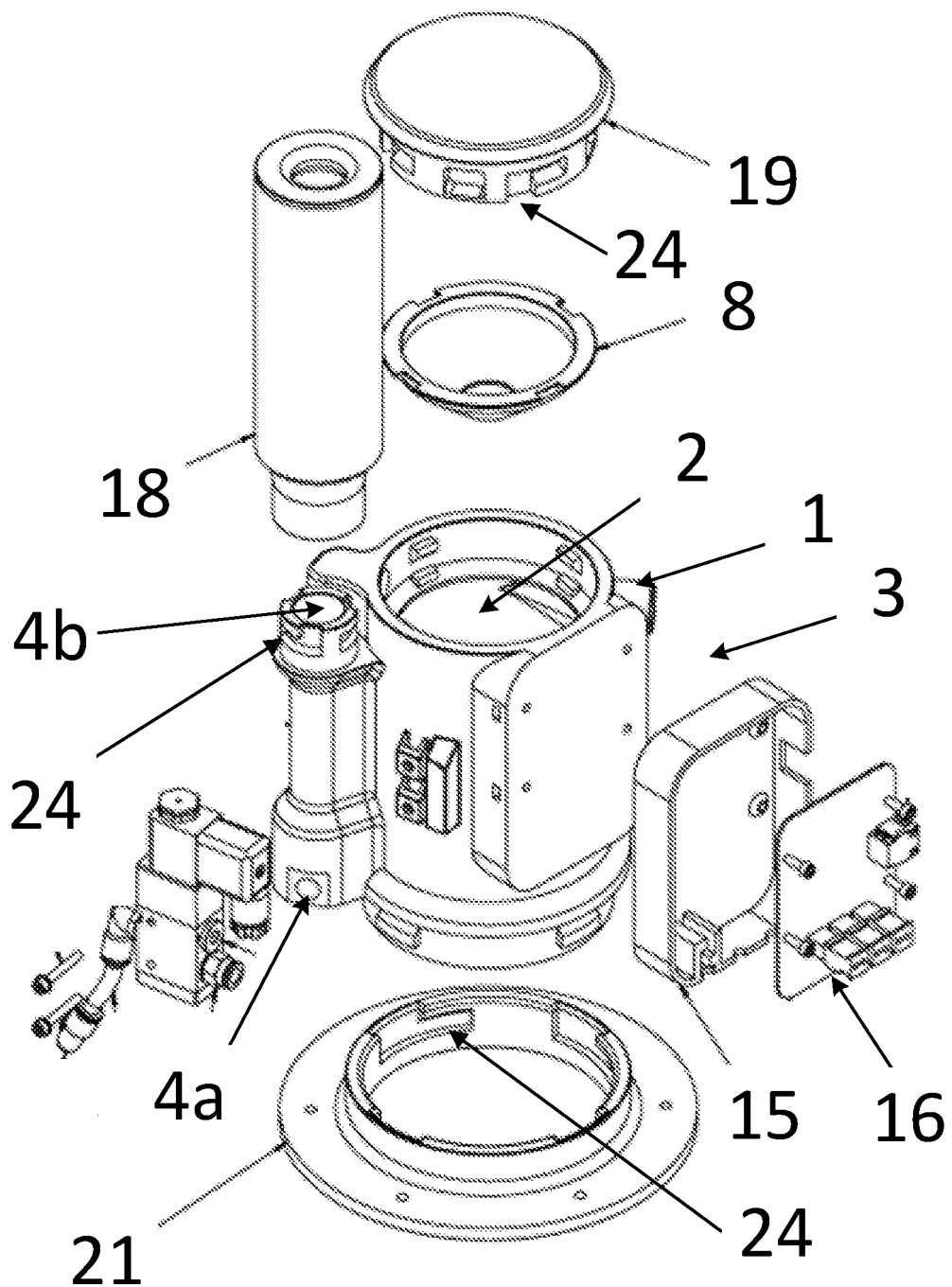
FIG. 5 is an illustration of an embodiment of the present invention, wherein the illustration shows the invention in an exploded view.
Figure 6:
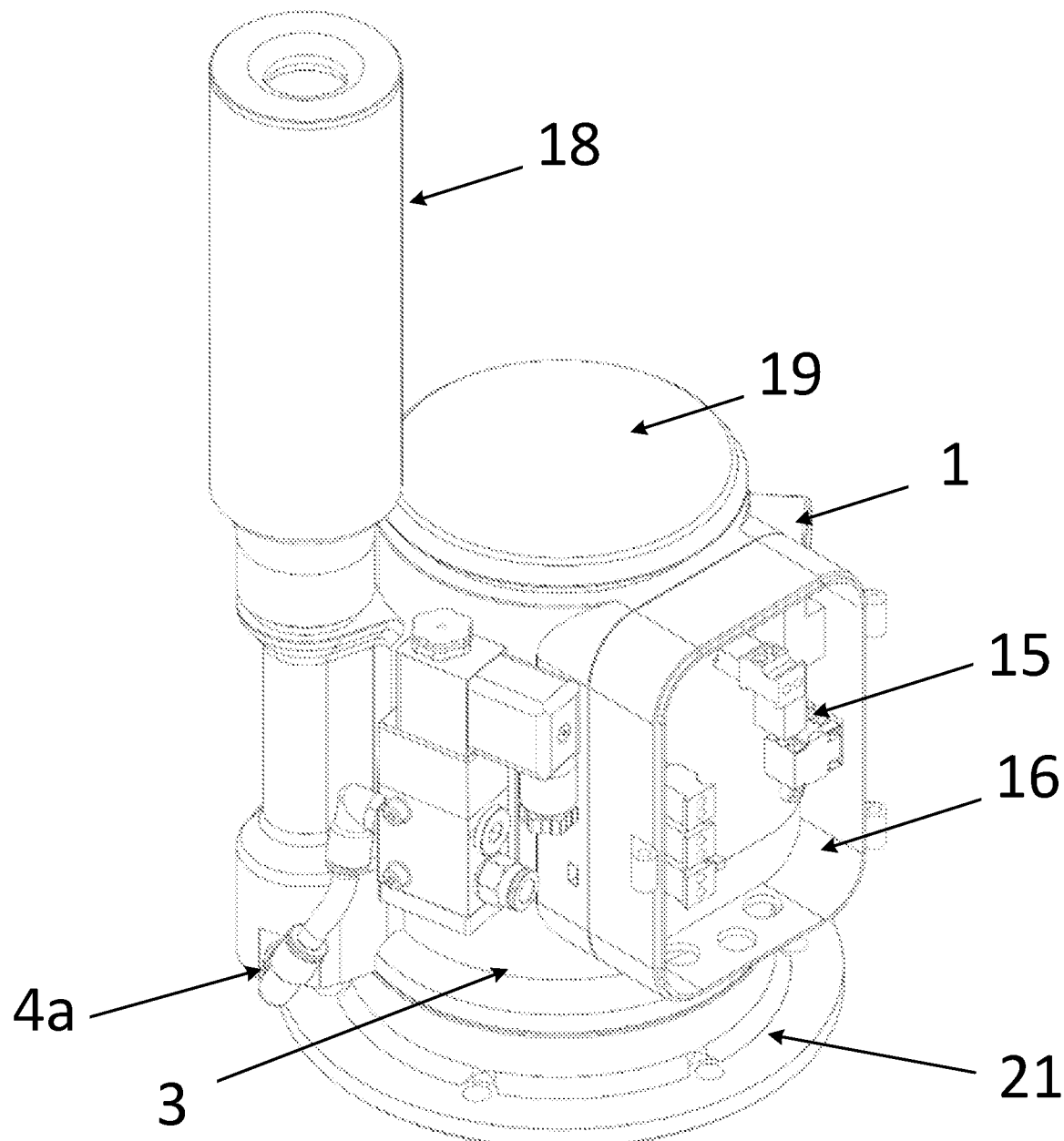
FIG. 6 is an illustration of an embodiment of the present invention, where the illustration shows the invention in a three-dimensional view and shows the inside of an embodiment of the external cavity comprising a control unit.

Reference is made to FIGS. 3, 5 and 6 depicting a preferred embodiment of a conveyor according to the present invention. FIG. 3A illustrates the embodiment from a top view, FIG. 3B illustrates the same embodiment from a three-dimensional cross sectional view, FIG. 5 illustrates an exploded view of the embodiment, whereas FIG. 6 illustrates a three-dimensional view of the embodiment. The features of the embodiment described in FIGS. 1 and 2 may also be present in the embodiment described in FIGS. 3, 5 and 6. However, the embodiment shown in FIGS. 3, 5 and 6 further comprise an external cavity 16, containing a control unit 15, a hose 26 connected to the inlet 4a of the venturi 4, for feeding pressurized air into the venturi 4 and a flange 21 to which the main body 3 may be connected.

Many embodiments of the conveyor make use of electrical control unit 15, such as computer, e.g. to sense if the valve 6 is open or close and/or determining the amount of material in the cavity, and such a control unit 15 may be integrated into the conveyor. In some embodiments including a controller, the conveyor may further comprise an external cavity 16 configured for or containing the control unit 15. By external is preferably meant that access to the cavity 15 can be obtained from the outside of the conveyor, which in many preferred embodiments is embodied as the external cavity 16 being provided at the outside of the main body. Thereby, the control unit 15 is shielded from granulate and/or powdery material located inside the conveyor.

Accordingly, a conveyor according to another preferred embodiments may further comprise a control unit 16 being configured for controlling the electro-mechanically valve. Typically, such a control unit 16 is configured for exchanging control signal(s) and/or data through a connector, preferably being an RJ45 connector, which connector also applies power to the control unit. In other embodiments, the power may be applied through a separate connector.

The inlet of the venturi 4 may be provided with a snap-coupling, for connecting a hose feeding pressurized air into the venturi 4. The connection of a hose feeing pressurized air into the venture 4 may be provided by a coupling as such. Such a coupling or snap-coupling may advantageously be a part being screwed into the conveyor, and the thread in the conveyor may be provided during a 3D-printing process providing the conveyor main body 3, or may be provided by a thread forming tools after the conveyor main body 3 has been provided.

Figure 4:
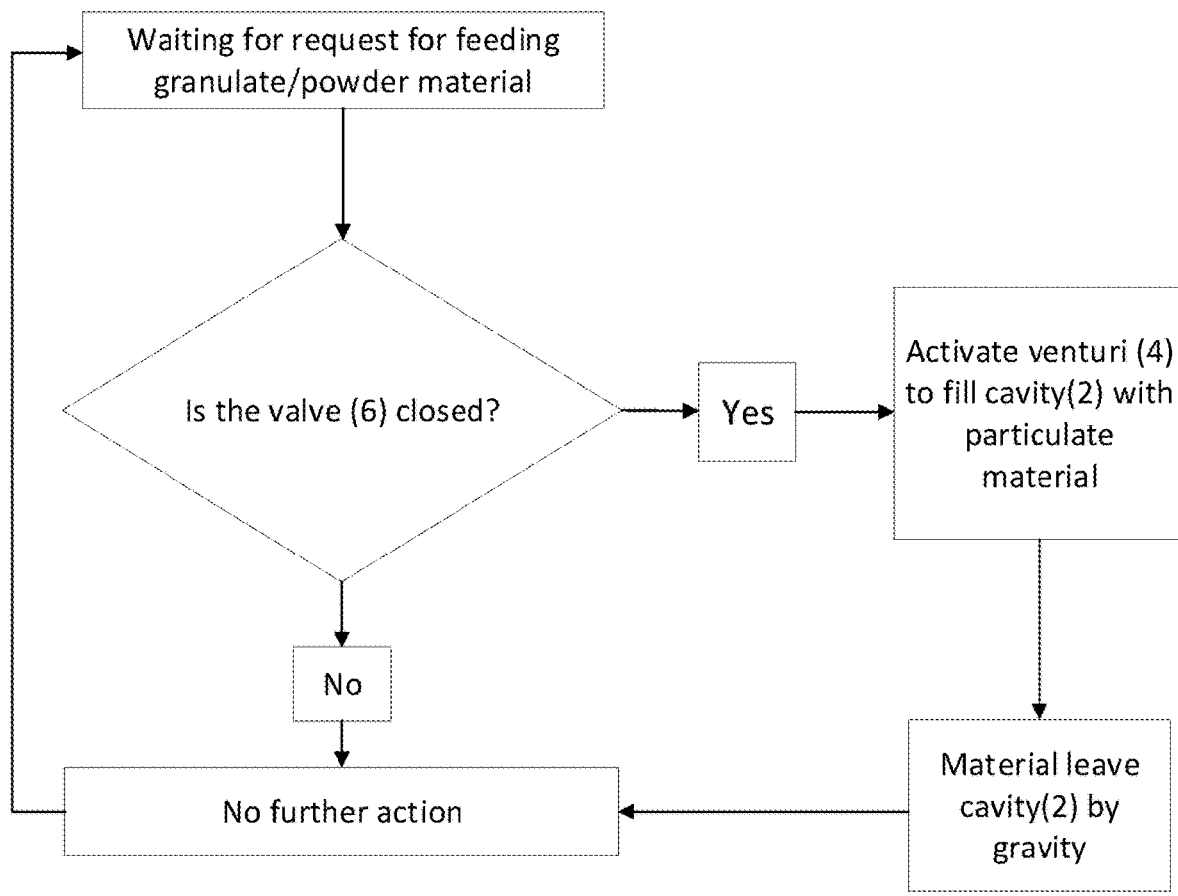
FIG. 4 is a flow chart illustrating an embodiment of a control sequence for use of conveyor, preferably being a conveyor according to preferred embodiments of the invention.

Reference is made to FIG. 4 being a flow chart illustrating an embodiment of a control sequence for use of conveyor according to preferred embodiments of the invention. The control sequence is typically carried out by the control unit disclosed herein, but may be embodied differently.

As illustrated, control sequence being with "waiting from request for feeding of granulate and/or powdery material" that is a request for feeding of material to the cavity.

When a request is received, it is checked whether the valve 6 is closed. If yes, the venturi 4 is activated and the cavity 2 is filled with granulated and/or powdery material. Once the cavity 2 is filled, the valve 6 opens and the material in the cavity leaves the cavity by gravity. Thereafter, the control sequence revert to the step of "waiting for request . . . "

If the valve 6 is not closed—that is open—and a request for feeding is received, no action is taken.

Figure 7:
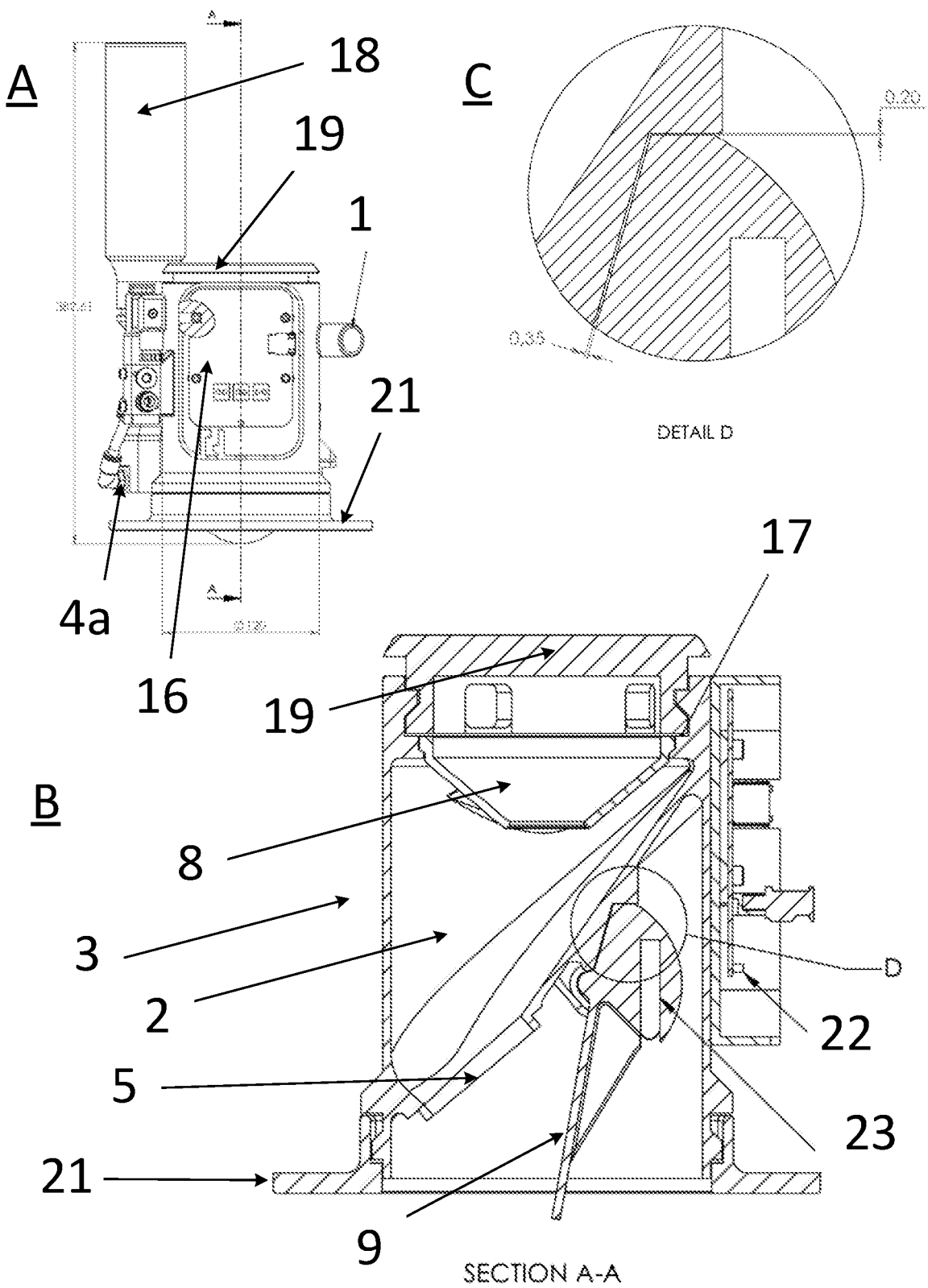
FIG. 7 is an illustration of an embodiment of the present invention, wherein the illustration shows the invention from a side view (A), a cross sectional view (B) and a zoom in on a detail of the invention (C)

Reference is made to FIG. 7 depicting another embodiment of a conveyor according to the present invention. The features of the embodiment described in FIG. 7 may also be present in the embodiment described in FIGS. 1-3 and 5-6.

FIG. 7A illustrated the embodiment from a side view, FIG. 7B illustrates the same embodiment from a cross sectional view and FIG. 7C illustrates a detail of FIG. 7B.

FIG. 7B illustrates an embodiment of the conveyor where the valve 6 is in the open position. A sensor, such as a hall sensor 22, is depicted on the figure, configured for detecting whether the valve is in the open or closed position. As illustrated in FIG. 7B, a space for a magnet is provided in the valve 6.

Figure 8:
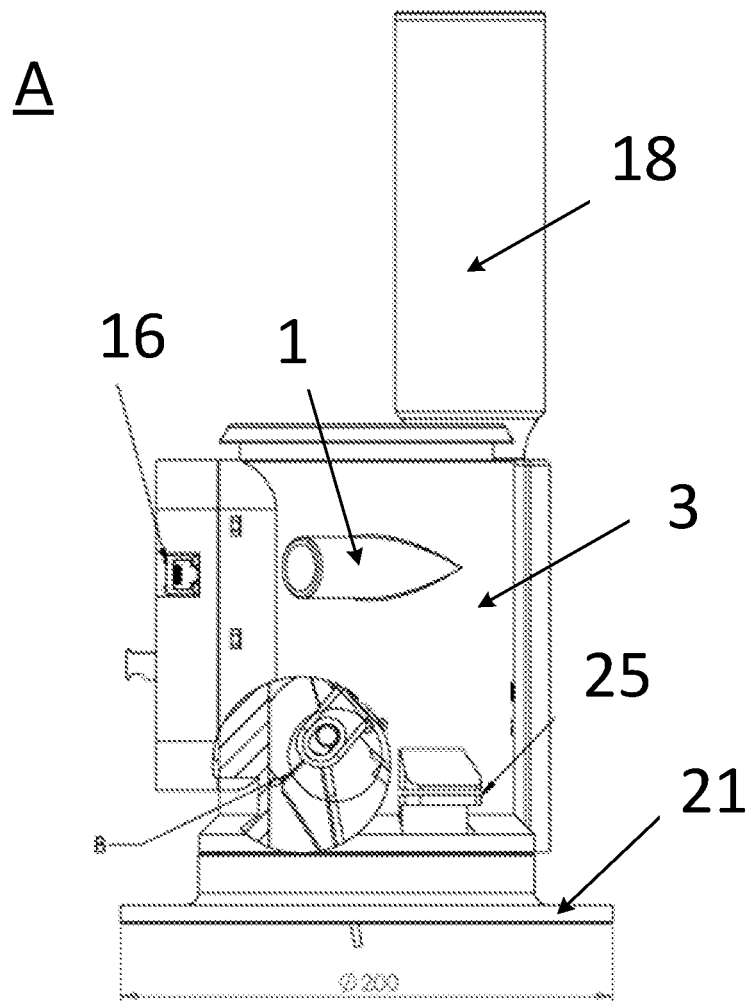
FIG. 8 is an illustration of an embodiment of the present invention, wherein the illustration shows the invention from a side view (A) and a zoom in on a detail within the cavity of the conveyer (B)
Figure 8:
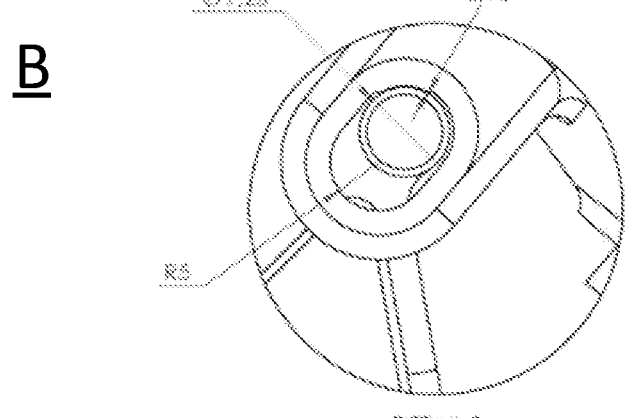

The detail in FIG. 7C illustrates an enlarged view of Detail D in FIG. 7B Reference is made to FIG. 8 illustrating another embodiment of a conveyor according to the present invention. The features of the embodiment described in FIG. 8 may also be present in the embodiment described in FIGS. 1-3 and 5-7. FIG. 8A illustrated the embodiment from a side view, as well as a detail within the cavity 2 of the conveyer and FIG. 8B illustrates a detail of FIG. 8A.

FIG. 8A further illustrates a locking mechanism 25 for fixating the main body 3 and flange 21 in a connected arrangement. When the main body 3 and flange 21 have been connected, for example by a bayonet joint, a lower section of a locking mechanism depicted in FIG. 8 can be pushed down, or configured to fall downwards by gravitational force, fixating the main body 3 and flange 21, e.g. acting as a locking pawl. To release the main body 3 from the flange 21, the lower section of the locking mechanism 25 have to be manually pushed up before the main body 3 can be separated from the flange 21.

FIG. 8B illustrates an enlarged view of Detail B of FIG. 8A. As illustrated, the hinge comprising an oval shaped opening in which the pivot axel is arranged.

Figure 9:
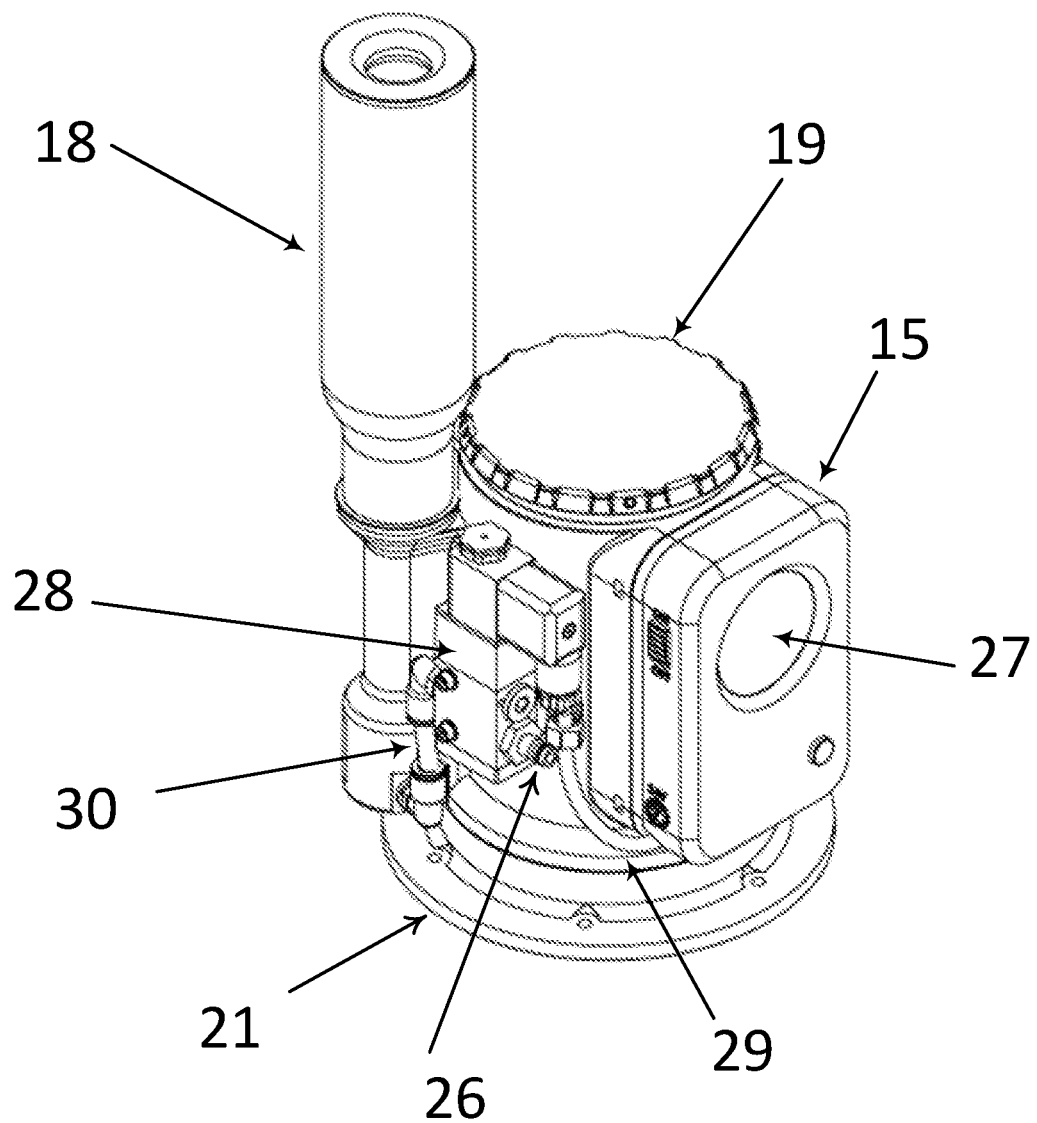
FIG. 9 is a 3-dimensional view of a conveyor as shown in FIG. 5 in assembled state.

FIG. 9 is a 3-dimensional view of a conveyor as shown in FIG. 5 in assembled state. Relatively to FIG. 5 some reference numbers have been omitted to make the figure more clear. FIG. 9 shows an embodiment with a display 27 configured to display different operation modes of the conveyor by receiving display instructions from the control unit 16. The display 27 is typically configured to display information by use of LEDs, such as multicolored LEDs. The information displayed e.g. be in the form of emoji's, where a "happy smiley" signals normal operation mode. Further, a rotating light pattern may signal suction in progress, and a red light circle may signal an error.

FIG. 9 also shows a magnetic valve 28 (or similar valve mechanism) with a connection 26, such as a snap coupling, for connecting a hose feeding pressurized air into the venturi through an inlet port of the valve 28. The opening and closing of the valve 28 is controlled by the control unit 16 and is connected thereto by the electrical control signal connection 29. An outlet port of the valve 28 is connected to the inlet of the venturi 4a by the pressurized air connection 30. Thus, during use of the conveyor, the control unit 16 opens and closes the valve 28 thereby controlling whether or not pressurized air is fed into the inlet of the venturi 4a.

Please observe that dimensions provided in the figures are not to be construed as limiting for the scope of the invention since the device according to the invention may be provided with dimensions being different from those given in the figures.

Dimensions indicated in the figures are provided in mm and are not to be construed as limiting the scope of the invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Inlet for conveyed material
2 Cavity
3 Main body
4 Venturi
4a Inlet of venturi
4b Outlet of venturi
5 Opening
6 Valve
7 Suction channel
8 Restrictor
9 Valve plate
10 Air flow
12 Suction
13 Upper end
14 Lower end
15 External cavity
16 Control unit
17 Air filter
18 Silencer
19 Lid
20 Hinge
21 Flange
22 hall sensor
23 magnet/space for magnet
24 part of bayonet joint
25 locking mechanism
26 Connection, such as a snap coupling, for connecting a hose feeding pressurized air into the venturi
27 Display
28 Magnetic valve (for pressurised air)
29 Electrical control signal connection for magnetic valve
30 Pressurized air connection

The invention claimed is:

1. A vacuum conveyor for conveying a granulate and/or powdered material, the conveyor comprising:
   a main body having an upper end and a lower end;
   a cavity inside the main body, said cavity comprising an opening arranged at the lower end of the main body;
   a valve arranged at the opening positionable between an open position allowing a flow of granulate and/or powdered material out from the cavity through said opening and a sealing position sealing said opening;
   an inlet arranged at the upper end of the main body forming an inlet passage into the cavity;
   a venturi inside the main body at a position being distinct from the cavity, said venturi comprising a venturi inlet and a venturi outlet, wherein said venturi outlet is at a position being distinct from said cavity and said opening; and
   a suction channel fluidly connecting the throat of the venturi with the interior of the cavity at a position at or above the inlet;
   wherein the upper end of the main body is formed by a detachable lid, said lid and main body comprising a bayonet joint and, wherein at least a part of the suction channel is provided in said lid.

2. The conveyor according to claim 1, wherein the valve is biased towards the sealing position by a counter balancing weight arranged so that gravity maintains it in its sealing position until the weight of the granulate and/or powdered material in the cavity exceed the counterbalancing weight, thereby opening the valve.

3. The conveyor according to claim 1, wherein the valve comprises a valve plate having a valve seat of a dimension being sufficient to cover the opening, said valve plate being rotatably hinged by a hinge to said main body, so that the valve plate rotatably can be moved between the sealing position and the open position.

4. The conveyor according to claim 1, wherein the conveyor is provided with a sensor for sensing whether the valve is in the open or sealing position.

5. The conveyor according to claim 1, wherein the conveyer further comprises a weight sensor for sensing the amount of granulate and/or powdered material in the cavity.

6. The conveyor according to claim 1, wherein the conveyor further comprises a funnel shaped restrictor arranged inside said cavity and narrowing down in the direction towards the lower end with its smallest cross section below or at a lowest position of the inlet.

7. The conveyor according to claim 1, wherein the conveyor further comprises an air filter configured to filter out particulates before air is sucked into the suction channel.

8. The conveyor according to claim 1, wherein the conveyor further comprises an air filter configured to filter out particulates before air is sucked into the suction channel and wherein said lid secures the air filter in a fixed position.

9. The conveyor according to claim 1, wherein the main body is formed as an integral element with the venturi including the venturi inlet and venturi outlet, the inlet and the suction channel formed by shaping the main body.

10. The conveyor according to claim 1, wherein the venturi inlet of the venturi is provided with a snap-coupling, or a hose coupling, and wherein the hose coupling is configured to attach a hose, which is capable of feeding pressurized air into the venturi.

11. The conveyor according to claim 1, wherein said venturi has no moving parts.

12. The conveyor according to claim 1, further comprising a silencer arranged at the venturi outlet of the venturi and configured to dampen noise generated by air flowing through the venturi.

13. The conveyor according to claim 12 wherein the silencer is releasable and arranged at the venturi outlet through a bayonet joint.

14. The conveyor according to claim 1, wherein the conveyer further comprises an external cavity configured to house a control unit or, which houses a control unit.

15. The conveyer according to claim 1, wherein the main body is provided with a snap-coupling for connecting the main body with a flange.

16. The conveyor according to claim 1, wherein the main body and a flange can be fixated in a connected arrangement by a locking mechanism.

17. The conveyor according to claim 1, wherein the main body and/or the inlet and/or the venturi and/or the external cavity and/or the suction channel and/or silencer and/or restrictor and/or valve and/or the lid essentially consist of a plastic material.

18. The conveyor according to claim 1, wherein the weight of the conveyor is less than 5 kg.

19. The conveyor according to claim 1, wherein the capacity of the conveyor is at least 3 kg/hours.

20. The conveyer according to claim 1, wherein the lift of the conveyer is at least two meters.

21. The conveyor according to claim 1, further comprising a display configured to display different operation modes of the conveyor.

22. A method for conveying a material from one point to another using the conveyer according to claim 1, comprising:
providing a flow of compressed air through the venturi to provide a suction at the inlet, wherein granulate and/or powdered material can be conveyed through the inlet into the cavity, when the control unit receives a signal from said sensor indicating that the valve is in the sealed position;
shutting of the flow of compressed air through the venturi when the control unit receives a signal from said weight sensor or a timer exceeds a predefined time period, indicating that the amount of granulate and/or powdered material within the cavity is above a certain threshold;
opening of the valve as a result of gravity, wherein granulate and/or powdered material flows out of the opening; and
closing of the valve as a result of gravity when the cavity is emptied, due to the counter balancing weight arranged so that the valve is biased towards its sealed position.

23. A method for manufacturing the conveyer according claim 1, the method comprising 3D printing the main body and/or the inlet and/or the venturi and/or the suction channel and/or valve.

24. The method for manufacturing the conveyer according to claim 23, wherein the main body is 3D printed, with the venturi, including the venturi inlet and venturi outlet, the inlet and the suction channel formed by shaping the interior of the main body to provide the contours thereof.

25. A vacuum conveyor for conveying a granulate and/or powdered material, the conveyor comprising:
a main body having an upper end and a lower end;
a cavity inside the main body, said cavity comprising an opening arranged at the lower end of the main body;
a valve arranged at the opening positionable between an open position allowing a flow of granulate and/or powdered material out from the cavity through said opening and a sealing position sealing said opening;
an inlet arranged at the upper end of the main body forming an inlet passage into the cavity;
a venturi inside the main body at a position being distinct from the cavity, said venturi comprising a venturi inlet and a venturi outlet, wherein said venturi outlet is at a position being distinct from said cavity and said opening; and
a suction channel fluidly connecting the throat of the venturi with the interior of the cavity at a position at or above the inlet;
wherein said valve is an electro-mechanical valve and the conveyor further comprises a control unit configured for controlling said electro-mechanical valve and, wherein said control unit is further configured to exchange control signal(s) and/or data through a connector.

* * * * *